United States Patent [19]

Rodgers et al.

[11] Patent Number: 4,492,819
[45] Date of Patent: Jan. 8, 1985

[54] GRAPHIC TABLET AND METHOD

[75] Inventors: James L. Rodgers, Mesa; Billy C. Fowler, Scottsdale, both of Ariz.

[73] Assignee: Kurta Corporation, Phoenix, Ariz.

[21] Appl. No.: 454,695

[22] Filed: Dec. 30, 1982

[51] Int. Cl.³ .............................................. G08C 21/00
[52] U.S. Cl. ..................................... 178/18; 33/1 M
[58] Field of Search ............. 178/18, 19, 20; 33/1 M, 33/23 J

[56] References Cited

U.S. PATENT DOCUMENTS 3,461,454  8/1969  Steckenrider ..................... 178/19
3,626,483  12/1971  Whetstone et al. ................. 178/18

Primary Examiner—Stafford D. Schreyer
Attorney, Agent, or Firm—Cahill, Sutton & Thomas

[57] ABSTRACT

A writing tablet is disclosed incorporating a plurality of conductors imbedded beneath the surface thereof in orthogonal relationship with respect to each other. The conductors form a grid for receiving radiated electric signals generated remote from the tablet and supplied to a pen acting as a radiating antenna. The radiated signals generate signals of varying amplitude in the respective grid conductors; the grid conductors in each of the X and Y directions are interconnected by resistors; terminals are provided at the outside conductors in the X and Y directions. The terminals are sequentially connected to a detector which in turn provides input signals to a dual slope integrator for ratioing the amplitude of the signal appearing at selected terminals. The output of the integrator is a timed wave form having a time value proportional to the position of the pen on the tablet surface.

12 Claims, 8 Drawing Figures

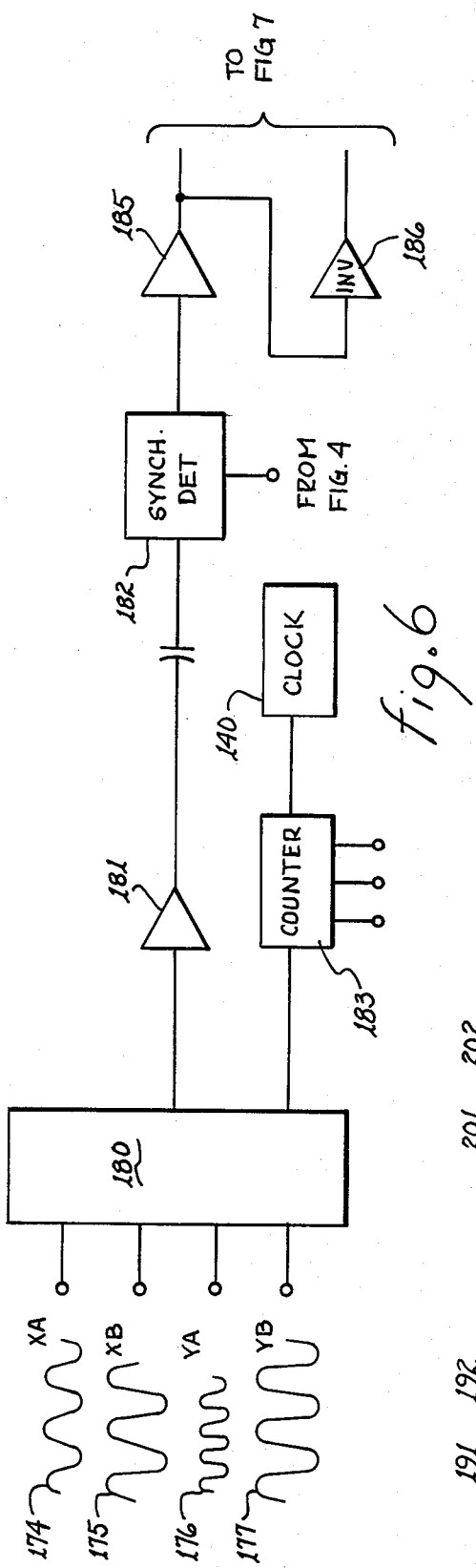
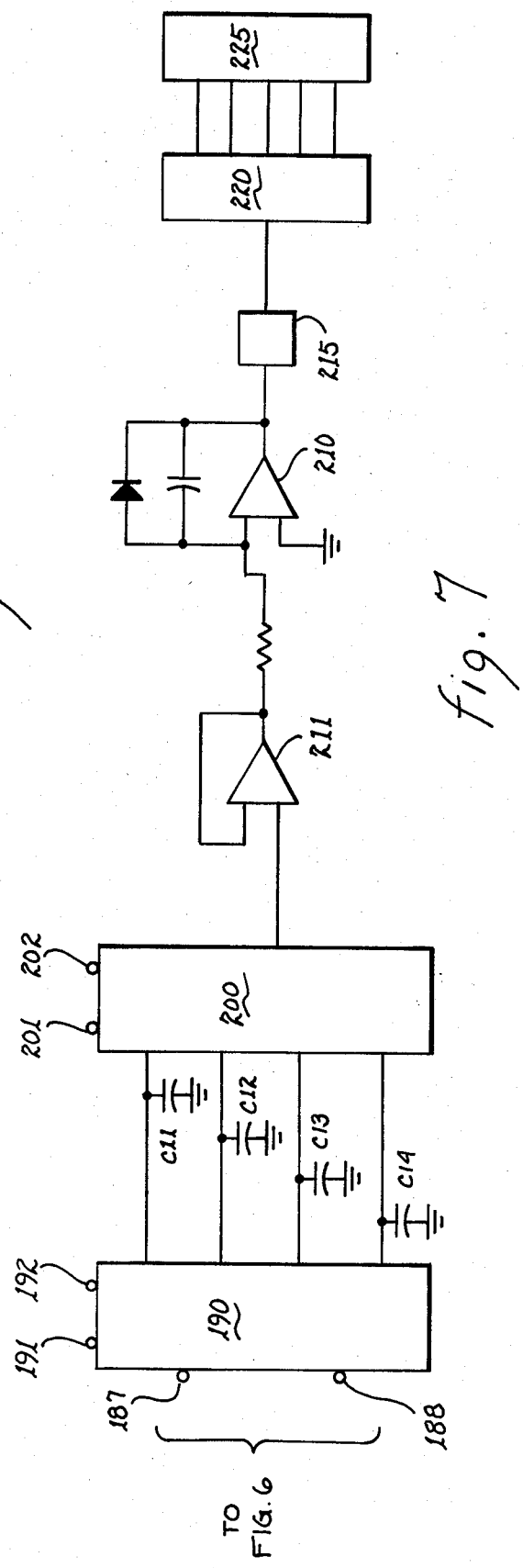
fig. 6
fig. 7

GRAPHIC TABLET AND METHOD

BACKGROUND OF THE INVENTION

1. Field of the Invention

The present invention relates to graphic tablets, and more particularly, to a tablet of the type incorporating grid wires therein and positioned beneath the surface of a tablet for receiving signals radiated from a pen.

2. Prior Art

A great variety of devices have been disclosed in the prior art for ascertaining the position of a pen on a graphic surface. These prior art techniques include the generation and radiation of electromagnetic waves as well as the radiation of electric waves. Typically, the prior art includes a means for applying power to the tablet with the pen being used as a receiving antenna for detecting the presence of a radiated signal in time and phase related to the generation of the signal in the tablet. For example, U.S. Pat. No. 3,767,858 incorporates the generation of signals supplied to the grid wires in the tablet; the signals supplied to the grid wires vary in frequency and phase. The electro-static field is sensed by the pen and is converted into an output that corresponds to the physical position of the pen apparatus. The apparatus described in this patent includes the use of two separate signal frequencies to separate the composite signals picked up by the pen; the signals are subsequently processed by separate phase-locked loops.

U.S. Pat. No. 3,851,097 discloses apparatus employing a phase-shifting technique similar to that described in U.S. Pat. No. 3,767,858, and uses phase-locked loops and frequency phase-shifts as a means for converting the position of the pen on the surface into corresponding electrical output signals. The system operates by the detection of the phase shift that occurs across the graphic surface in both X and Y directions by means of a phase-locked loop to detect the difference between the signal picked up by the pen and a reference frequency and phase source.

U.S. Pat. No. 3,886,311 discloses a pen and corresponding tablet surface employed for graphic communication. A pen capacitively picks up an electro-static field from the surface for the purpose of sensing location of the pen relative to the electrostatic field. The position of the pen is determined in terms of X and Y coordinates and provides an output signal in response to the position of the pen. The apparatus also discloses means for loading a writing element or ballpoint cartridge element by a side-loading method and discloses the use of the ballpoint element for writing on paper that may be placed on the graphic surface.

U.S. Pat. No. 3,983,222 discloses a method and apparatus for converting the position of a pen on a surface into corresponding output signals. The system involves the use of a phase-shift across the surface employing an electrostatic field for transmission to a receiving pen. The pen, in turn, provides an output signal to circuitry that resolves the position of the pen on the surface. Specifically, the system involves the use of phase-shift and frequency change in a servo system incorporating a phase-locked loop and error detector to determine the displacement of the pen from a central location on the surface of the tablet. In addition, the apparatus references the frequency and phase of the signal picked up by the pen with an internal reference in the phase-locked loop and includes a bandpass filter element that converts frequency shift into phase shift. The system operates in a servo mode in which the pen movement away from its center position, in both X and Y directions, creates an error signal that results in a frequency change in a phase-locked loop. The frequency changes in such a fashion as to attempt to minimize the net phase-shift at any position in which the pen may be located. It constitutes an electrostatic closed-loop feedback means of pen position detection with respect to the apparatus of U.S. Pat. Nos. 3,878,858, 3,886,311, 3,851,097.

U.S. Pat. No. 4,022,971 discloses another graphic communication system employing X and Y conductors in the graphic surface that generate an electrostatic field; the resultant electric field is sensed by a pen employing a phase-shift and a servo system that is substantially the same as those described in the previously discussed patents. However, the apparatus also employs a means to switch the location of the active grid elements in the surface from location to location so that the actual active area of the surface is limited to a small portion of the total graphic surface. Multiplexing circuitry is employed, in addition to the basic graphic methods previously described, to move the writing surface essentially from one position to another so that the pen is always located over an active surface area. The apparatus employs an electric signal fed to grid elements consisting of X and Y conductors that are sensed by the pen; by means of measurement of error detection of frequency and phase-shift an output signal is created that corresponds to the pen location on the total surface.

SUMMARY OF THE INVENTION

The invention described and claimed herein comprises apparatus and method for converting the physical position of a pen on a writing surface into corresponding output signals that are representative of the pen's position. The pen acts as an electrostatic signal source in which the ballpoint element of the pen is activated with a signal that is transmitted from the pen to a special graphic tablet surface that in turn picks up the received signal by means of X and Y grid elements.

The X grid elements are interconnected by resistors as are the Y grid elements. The X elements are arranged such that the interconnecting resistors are connected in series with a terminal at either end of the series. Similar terminals are provided for the Y grid elements or conductors. The four terminals present output signals whose amplitudes depend on the proximity of the pen point, in the plane of the tablet, to the respective grid wires. The signal amplitudes at the terminals is subsequently processed by the method of the present invention wherein the amplitudes of the terminals corresponding to the X grid elements is ratioed to provide an amplitude-independent signal corresponding to the position of the pen in the X direction. Similarly, the signals present at the Y grid terminals is processed to provide a signal proportional to the position of the pen in the Y direction.

It is therefore an object of the present invention to provide method and apparatus for converting the position of a pen on a graphic surface into output signals proportional to the position.

It is another object of the present invention to provide method and apparatus incorporating electrostatic coupling between a transmitting pen and a receiving tablet resulting in the generation of signals that are subsequently processed in accordance with the method of the present invention to derive a signal corresponding to the position of the pen on the tablet surface.

It is another object of the present invention to provide a graphic tablet incorporating passive elements for use in connection with an electrostatic signal radiating pen for the determination of pen position on the tablet surface.

It is still another object of the present invention to provide a method and apparatus for determining the position of a pen on the surface of a tablet through the utilization of a signal radiated from the pen, detected by grid wires in the tablet, and processed to provide an output signal proportional to the position of the pen on the tablet independent of the amplitude of the signal.

Other objects and advantages of the present invention will become apparent to those skilled in the art as the description thereof proceeds.

BRIEF DESCRIPTION OF THE DRAWINGS

FIG. 6 and FIG. 7 are schematic block diagrams showing the system of the present invention and useful in describing the method for processing the signals in accordance with the teachings of the present invention.

DETAILED DESCRIPTION OF THE PREFERRED EMBODIMENT

The preferred embodiment will now be described by reference to the diagrams and wave forms shown in the accompanying drawings.

Figure 1:
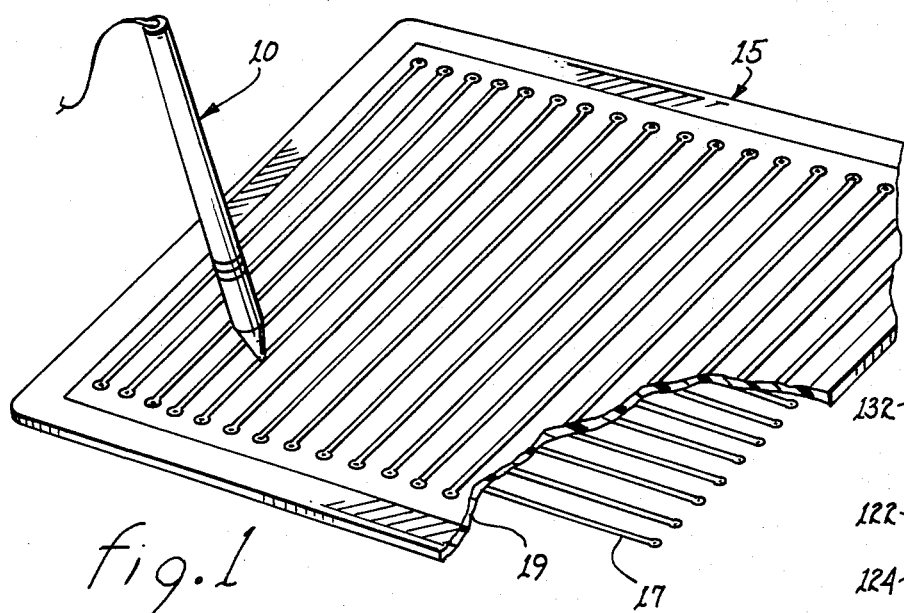
FIG. 1 is a pictorial representation of a graphic tablet and pen constructed in accordance with the teachings of the present invention.
Figure 3:
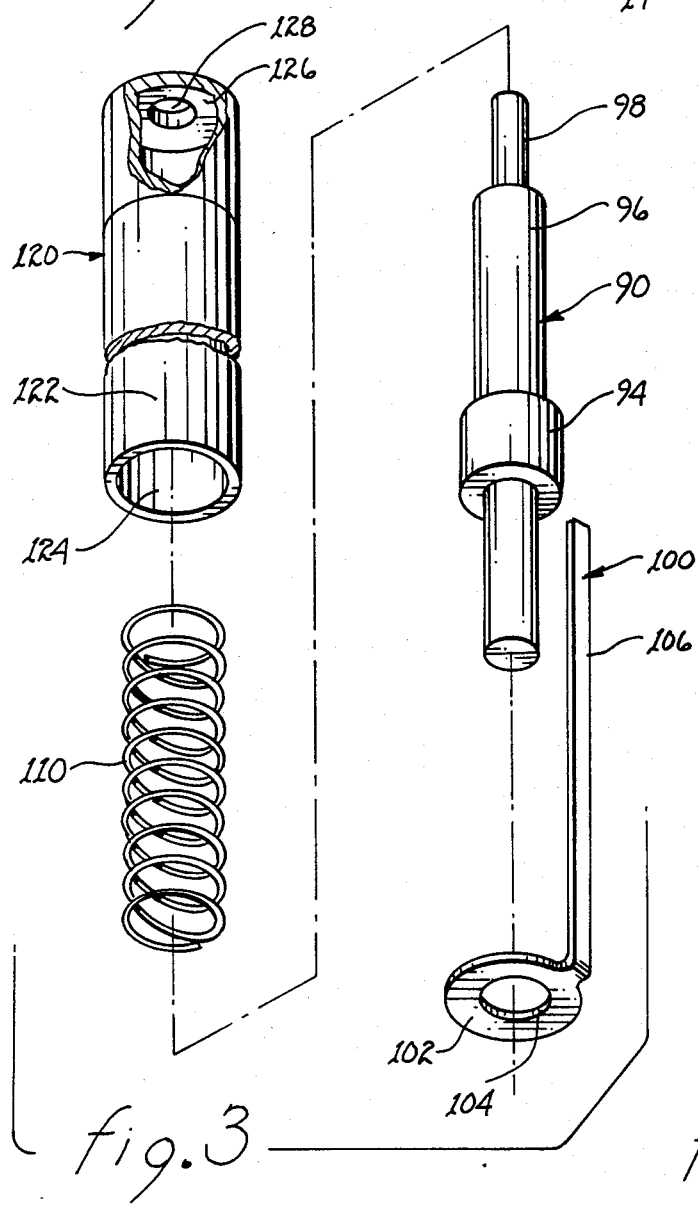
FIG. 3 is an exploded view of portions of the pen of FIG. 2.
Figure 2:
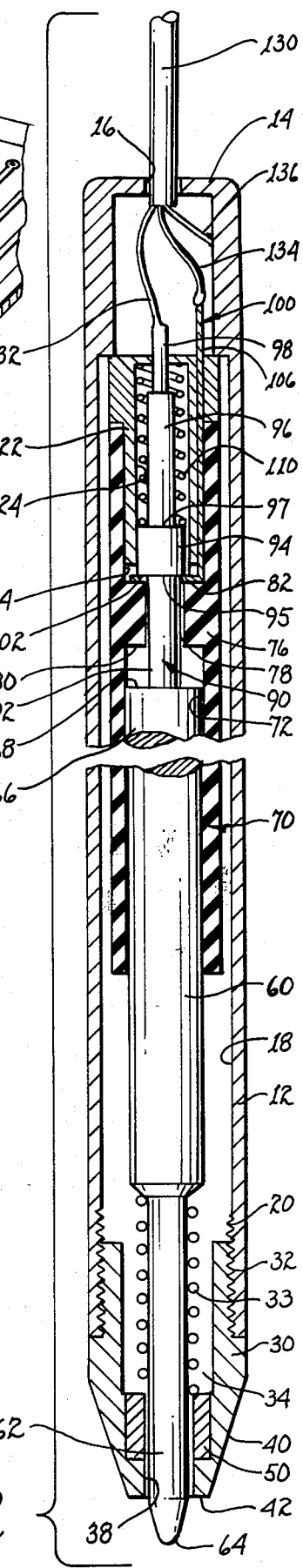
FIG. 2 is a cross-sectional view of a pen constructed in accordance with the teachings of the present invention.

Referring to FIGS. 1-3, a schematic representation of the graphic tablet of the present invention with a pen in proximity thereto is shown. The pen 10 is shown adjacent the surface of the tablet 15. The tablet incorporates a plurality of orthogonally related grid elements 17 each comprising a conductor extending parallel to adjacent conductors and spaced from perpendicularly oriented conductors by a sheet of insulating plastic material 19. These orthogonally related grid elements constitute X and Y grid conductors which sense the output signal from the pen 10 as will be described more fully hereinafter. The output signals from the X and Y grid elements are in turn translated into physical position information which results in a determination of the location of pen 10 with respect to the tablet 15. The movement of the pen 10 accordingly is translated into signals which correspond to the pen position.

The pen apparatus 10 includes a housing 12 which is of a generally cylindrical, elongated configuration. The housing 12 has an upper end wall 14 at one end thereof. The upper end wall 14 includes an aperture 16 extending through the end wall. Within the cylindrical housing 12 is an internal bore 18. At the bottom or lower end of the housing 12, remote from the upper end wall 14, is an internally threaded portion 20. The housing 12 is open at its lower end, and the internal threads 20 are used to secure a tip 30 to the housing 12.

The tip 30 includes an externally threaded portion 32 that mates with the internal threads 20 of the cylinder to secure the tip to the cylinder or housing 12.

Within the tip 30 is an interior bore 34; the bore 34 communicates directly with the bore 18 of the housing 12. A spring is positioned within the bore 34 and is concentrically positioned about the pen cartridge; the spring 33 abuts a bushing 50 and the bore 34 and urges the pen cartridge into the bore 18. The spring 33, as will be described more fully hereinafter, is overcome with spring pressure of a second spring to be described in order to cause the point of the cartridge to protrude from the pen cartridge in preparation for contact with the graphic tablet.

The outer configuration of the tip 30 is generally cylindrical, and is substantially of the same outer diameter as the outer diameter of the housing 12 at the juncture of the housing 12 and the tip 30. Downwardly from the cylindrical portion of the tip 30 is an inwardly tapering portion 40 terminating in a bottom 42, the latter defining an end wall which communicates with the bore 38.

A cylindrical bushing 50 is disposed within the bore 34. The bushing 50, when the pen is in a vertical writing position such as shown in FIG. 1, extends downwardly with respect to the bore 34, and is contacted by the spring 33.

Disposed within the central and upper portions of the bore 18 of the housing 12 is a pen insulator 70. The insulator 70 includes a lower bore 72 in which is disposed the cylindrical portion 60 of the pen cartridge, and an upper bore 74, in which is disposed switching apparatus for the pen as will be discussed below. Connecting the two bores 72 and 74 is a relatively short bore 78, the diameter of which is substantially less than the diameters of the bores 72 and 74. The short bore 78 extends through a central wall 76.

The pen element is disposed within the bore 18 of the housing 12, and includes a lower portion 62 which extends through the bottom 42 of the housing 12. The pen may be a typical ball point pen which includes a writing tip 64 disposed beneath, and outwardly from, the lower portion 62. The tip 64 of the ball point pen is used to write on paper, or the like, disposed on the tablet 15.

Above the lower portion 62 of the pen is the cylindrical portion 60 which extends into the lower bore 72. Extending upwardly from the portion 60 and coaxially with respect thereto is a plunger 90 which is used for switching purposes. The plunger 90 includes four portions, including a lower portion 92, which is disposed upwardly from, or above, the top 68 of the pen barrel 66. This lower portion is cylindrical in configuration, and extends downwardly through the connecting bore 78 of the central wall 76 of the pen insulator 70 and into the upper bore 74 of the pen insulator 70. The lower portion 92 has a diameter which is slightly less than that of the bore 78.

Above the lower portion 92 is a midportion 94. The midportion 94 of the plunger 90 is disposed within the upper bore 74 of the pen insulator 70. The diameter of the midportion 94 is slightly greater than that of the lower portion 92, and greater than the diameter of the bore 78. The axial length of the midportion 94 is somewhat less than the axial length of the lower portion 92. A shoulder 95 extends radially outwardly at the juncture of the lower portion 92 and the midportion 94. An upper portion 96 extends upwardly from the midportion 94, its diameter being somewhat less than that of the midportion 94.

A shoulder 97 extends radially outwardly from the juncture of the midportion 94 and the upper portion 96. The shoulders 95 and 97 are generally parallel to each other and comprise the bottom and top respectively, of the midportion 94. These shoulders may be sloped but parallel to each other, to provide "wiping" action when closing to maintain good electrical contact. A top extends upwardly from the upper portion 96 and is used for connecting an appropriate electrical conductor 132 to the plunger 90.

Within the upper bore 74 is a switch element 100 including a lower, annular contact 102 and an elongated blade or lead 106 which extends upwardly from the outer periphery of the annular contact 102. An aperture 104 extends through the contact 102. The annular contact 102 is disposed on a shoulder 82 which defines the top of the central wall 76. The central wall 76 also includes a lower shoulder 80 which faces the lower bore 72. The lower portion 92 of the plunger 90 extends through the connecting bore 78 through the central wall 76 and into the lower bore 72. The blade or lead 106 extends along the side of the bore 74 and terminates above the pen insulator 70.

A switch holder 120 is disposed within the bore 74 and above the contact 90, or about the upper portion 96 and the mid-portion 94 of the contact 90. The switch holder 120 is generally in the configuration of an inverted cylinder, and it includes a cylinder housing 122 having a bore 124 therein. The cylindrical housing 122 is closed by an upper end wall 126 which has an aperture 128 extending substantially coaxially therethrough. As shown in FIG. 2, the top 98 of the contact 90 extends through the aperture 128.

A spring 110 is disposed in the bore 124. The spring 110 is a compression spring which bears against the end wall 126 at one end and bears against the top of the midportion 94 of the contact 90 at its opposite end. The spring 110 accordingly provides a bias between the contact 90 and the switch holder 120. The upper portion 96 of the contact 90 is disposed within the spring 110. The spring 110 provides a bias against the contact 90 to bias the midportion 94 against the annular contact 102 and against the shoulder 82 of the pen insulator 70. This in turn biases the pen cartridge 60 downwardly through the tip 30 of the pen 10 and overcomes the opposite biasing force of the coil spring 33.

When the pen 10 is in use, with the tip 64 disposed on a writing surface, such as on a piece of paper disposed on the writing tablet 15, the pen element 60 is moved upwardly in the housing 12 with respect to the pen insulator 70 and against the contact 90, which moves against the bias of the spring 110.

A conductor cable 130 extends through the aperture 16 in the housing 12. The cable 130 includes three insulated conductors 132, 134, and 136. The conductor 132 is electrically connected to the top portion 98 of the contact 90, and the conductor 134 is electrically connected to the blade 106 of the switch element 100. The conductor 136 is appropriately secured to the housing 12, preferably at the upper end of the internal bore 18, all as shown in FIG. 2.

It will be understood that the plunger 90 is made of conductive material to provide an electrical conductor from the conductor 132 of the cable 130 to the top 98 of the plunger 90 and through the plunger to the top surface or end wall 68 of the pen cartridge 60. The plunger or contact 90 physically touches the top 68 of the pen 60; the pen 60, made of conductive material, provides an electrical conductor between the plunger or contact 90 and the tip 64. The tip 64, when it contacts a paper on the tablet 15 for writing purposes, pushes upwardly against the contact 90 to move the midportion 94 of the contact 90 away from the annular contact 102 of the switch element 100.

It will be noted that the pen insulator 70 defines a sleeve about the upper portion of the pen barrel 66 to perform two functions. The first function is to insulate the pen barrel 66 from the housing 12. The second function is to provide stability in a lateral sense with respect to the vertical movement of the pen 60 relative to the housing 12. The bore 72 of the insulator 70 thus acts as a guiding element or support element for providing lateral stability for the pen barrel 66 of the pen 60.

The tip 64 of the pen cartridge 60, and the metal bushing 50, comprise a small point source for the electrical signal being radiated into the tablet 15. The bushing 50 increases surface area of the antenna and thus increases the amplitude of the signal received by the grid. When the plunger or contact 90 is in electrical contact with the annular contact 102 of the switch element 100, the conductors 132 and 134 are directly connected. The spring 110 biases the contact 90 against the annular contact 102 of the switch 100 to electrically short the conductors 132 and 134. However, when the tip 64 of the pen cartridge is disposed on a surface, the pen cartridge 60 exerts an upward bias on the lower portion 92 of the contact 90 to move the contact 90 against the bias of the spring 110. When the midportion 94 of the contact 90 is moved upwardly within the bore 124 of the switch holder 120, electrical contact is broken between the contact 90 and the switch element 100. Electrical contact between the upper end or end wall 68 of the pen cartridge and the lower portion 92 of the switch contact 90 is maintained by the biasing force of the coil spring 33 to make the pen cartridge 60 an active radiating element to direct an electrical signal into the tablet 15.

Figure 4:
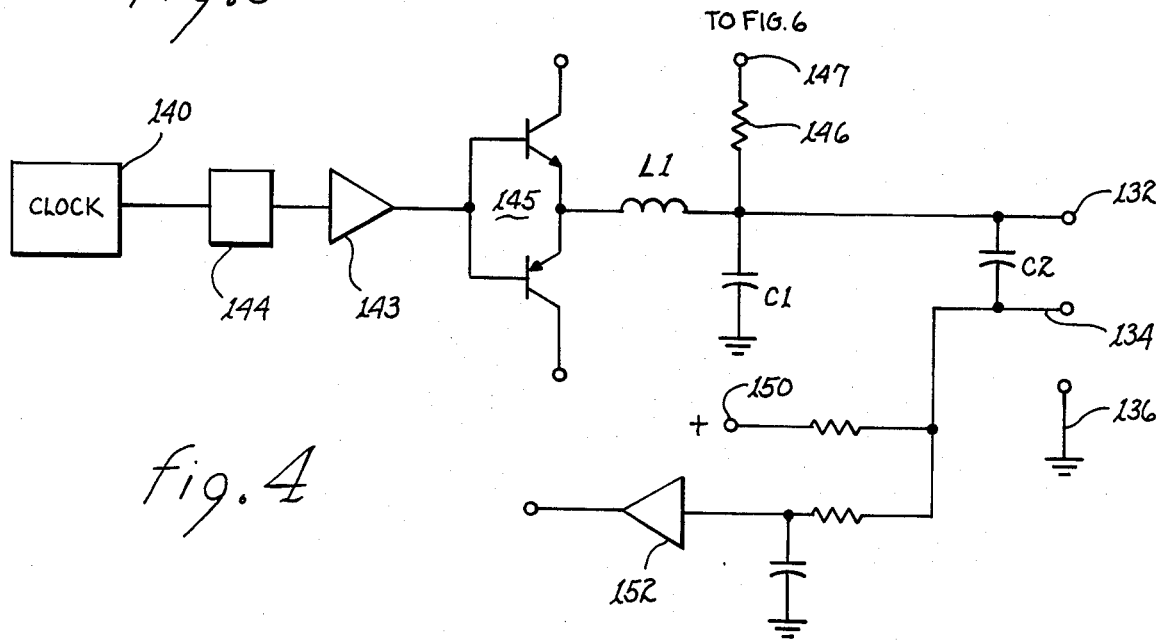
FIG. 4 is a schematic block diagram of the pen driver system incorporated in the present invention.

Referring to FIG. 4, the conductors 132, 134 and 136 are connected as shown to the circuit shown schematically in FIG. 4. A system clock 140 provides a signal at 55 KHz which signal is amplified in amplifier 143 after passing through phase changer 144, the latter to be described more fully hereinafter. The amplified 55 KHz signal is applied to driver circuit 145 and through a tuned LC circuit comprising inductance L1 and capacitor C1. The utilization of a tuned circuit such as that shown to drive the pen results in the multiplication of the voltage provided to the pen. For example, a nominal ten volt signal applied to the driver will result in an electrical signal of approximately one hundred volts available to the pen for radiation from the pen into the tablet surface. The AC load on the driver circuit is maintained constant regardless of whether or not the pen is radiating the signal to the tablet. A capacitor C2 provides an appropriate load to the driver circuit when the contacts of the pen are opened or closed. When pressure is applied to the pen point such that the pen contacts are opened, the load remains constant on the driver and power is supplied to the pen for radiation of the signal into the tablet surface. The use of a tuned circuit in the pen driver also provides the unique advantage of safety; that is, if an operator were to touch the pen tip, the circuit would automatically be detuned and therefore cause a significant drop in the voltage to prevent any possibility of electrical shock. The tuned circuit driver also produces a substantially pure sine wave to thereby eliminate unwanted frequencies, harmonics and other disturbances that result in unwanted electromagnetic interference (EMI). Since the pen is being used as the transmitter (unlike the utilization of transmission from a tablet to the pen), the pen is essentially low impedance therefore being essentially immune from small variations in impedances such as slight moisture in the paper positioned on the tablet. Further, a strong radiated signal propagating from the tip of the pen results in reduced noise since the antenna (the conductors in the surface of the tablet) are insulated from the major source of noise related to the mechanical movement and static generated by the rolling tip of the pen. Only the essentially strong radiated signal from the pen is therefore received by the grid.

The detection of the proximity of the pen to the tablet may be determined through the utilization of a DC circuit incorporating a DC source at terminal 150 connected through the contacts in the pen. When the contacts are closed (pen not in use) the DC path is completed through the driver; when the pen is placed on the paper supported by the tablet, the switch within the pen cartridge is opened resulting in an open circuit to the DC path which is detected by detector 152 to provide a "pen down" signal. Since the housing 12 of the pen is metal, the signal being propogated from the pen is shielded except at the very tip to thereby concentrate the signal at the tablet surface. Thus, an essentially pure sine wave of 55 KHz is radiated from the pen tip into the tablet.

Figure 5:
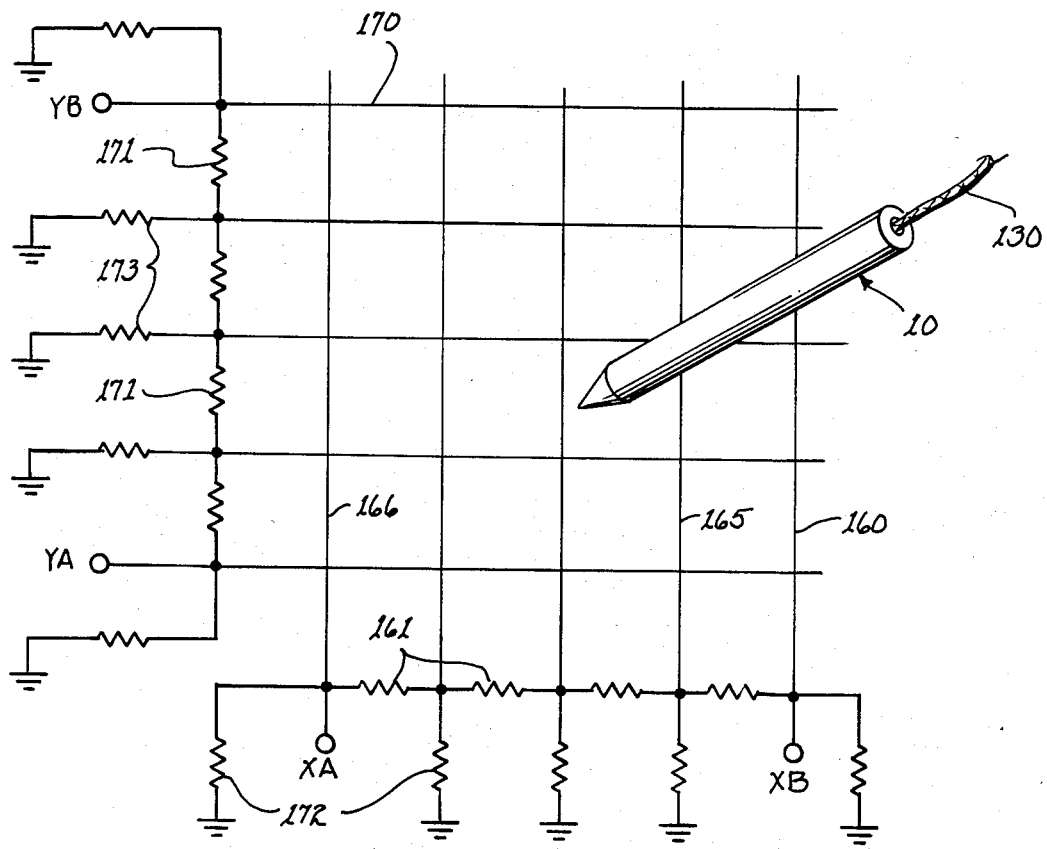
FIG. 5 is a schematic electrical diagram, somewhat simplified, of the grid conductors of the present invention showing the relationship of the grid conductors to the radiating pen.

Referring now to FIG. 5, the grid of the tablet is shown schematically. The X axis conductors 160 are introduced by resistors 161 of equal value. Resistance values can be changed to render signal detection nonlinear or to compensate for tablet fringe effects. The conductors 160 therefore act as antennae to detect the existence of the signal being radiated from the pen 10. The strength of the signal will depend upon the position, along the X axis, of the pen. Thus, if the pen is in close proximity to conductor 165, then the signal derived or detected by the conductor 165 will have a greater amplitude than that same signal detected for example by conductor 166. Since the conductors 160 are all interconnected through resistors 161, a voltage will appear at terminals XA and XB. The voltage at XA and at XB will depend upon the positioning of the pen 10 along the X direction of the tablet. For example, if the pen 10 were positioned at the left margin of the tablet, the voltage at XA would be minimum and the voltage at XB would be minimum. Similarly, positioning of the pen exactly in the middle of the X axis of the tablet would result in equal voltages at the terminals XA and XB.

Resistors 173 and 172 are utilized to insure that the impedance of each conductor, relative to ground, remains the same. These resistors are generally of the same resistance value and also contribute to the voltage division between terminals. The resistors also contribute to insuring linearity of signals at the terminals.

The conductors 170 are positioned orthogonally with respect to the conductors 160 and therefore permit the detection of the Y positioning of the pen 10. Each of the conductors 170 is interconnected by resistances of equal value 171 in a manner similar to those described above in connection with the X axis conductors. Further, the signals appearing at the terminals YA and YB are similarly proportioned to the positioning of the pen 10 along the Y axis or Y direction of the tablet. It may therefore be seen that the amplitude of the signal present at the four terminals XA, XB, YA, and YB presents a representation, in the form of voltage amplitude, of the positioning of the pen on the tablet surface.

Referring now to FIG. 6, the processing of the signals appearing at terminals XA, XB, YA, and YB for a particular pen position will be described. The signals at each of the above identified terminals will be a 55 KHz sine wave.

The amplitude of the respective sine waves will vary at each terminal depending on the positioning of the pen on the tablet. In FIG. 6, four separate 55 KHz sine waves are shown each having a unique amplitude corresponding to the amplitude present at one of the respective terminals. Thus, the wave form 174 corresponds to the signal present at terminal XA, the wave form 175 corresponds to the signal present at terminal XB, the wave form 176 corresponds to the wave form at terminal YA and the wave form 177 corresponds to the signal present at terminal YB. These signals are applied to a scanner or switch 180 which selectively connects each of the signals XA, XB, YA and YB through amplifier 181 to a synchronous detector 182. The timing of the switching of the respective signals is determined through the use of a counter 183 operating from the system clock shown in FIG. 6 at 140. The timing of the switch or scanner 180 is important in that the technique employed, and the concept used in the method of the present invention depends on using the ratio of the amplitude values present at the respective terminals rather than simply detecting the amplitudes and generating a signal in proportion thereto. The timing will be discussed in greater detail in connection with the wave forms to be discussed hereinafter. The resulting signal from the detector 182 is a varying DC voltage level that is amplified in amplifier 185. The output of amplifier 185 is also inverted in an inverter 186.

The signal from the amplifier 185 as well as that signal inverted in the inverter 186 is applied to the terminals 187 and 188 respectively of scanner 190 (FIG. 7). The scanner 190, operating in synchronism with the counter 183 of FIG. 6 through the terminals 191 and 192, selects the signals present at the terminals 187 and 188 to be applied to one of four capacitors C11, C12, C13 and C14. These capacitors may therefore be charged or discharged with a predetermined polarity by the application of signals from the terminals 187 or 188 depending on the state of the scanner 190.

The capacitors are also connected to a scanner 200 which selectively connects the respective capacitors to an integrator 210 through amplifier 211. The switching of the scanner 200 is controlled by the counter 183 (FIG. 6) through terminals 201 and 202.

The output of the integrator 210 is applied to a level detecting circuit 215 for detecting the level of the output of the integrator and for producing a latch pulse to be applied to a counter 220 to cause the count within the counter at the time of the latch signal or pulse to be dumped into a register 225. The counter 220 may be synchronized with the counter 183 of FIG. 6, or in some instances, a single counter may be used for both.

Figure 8:
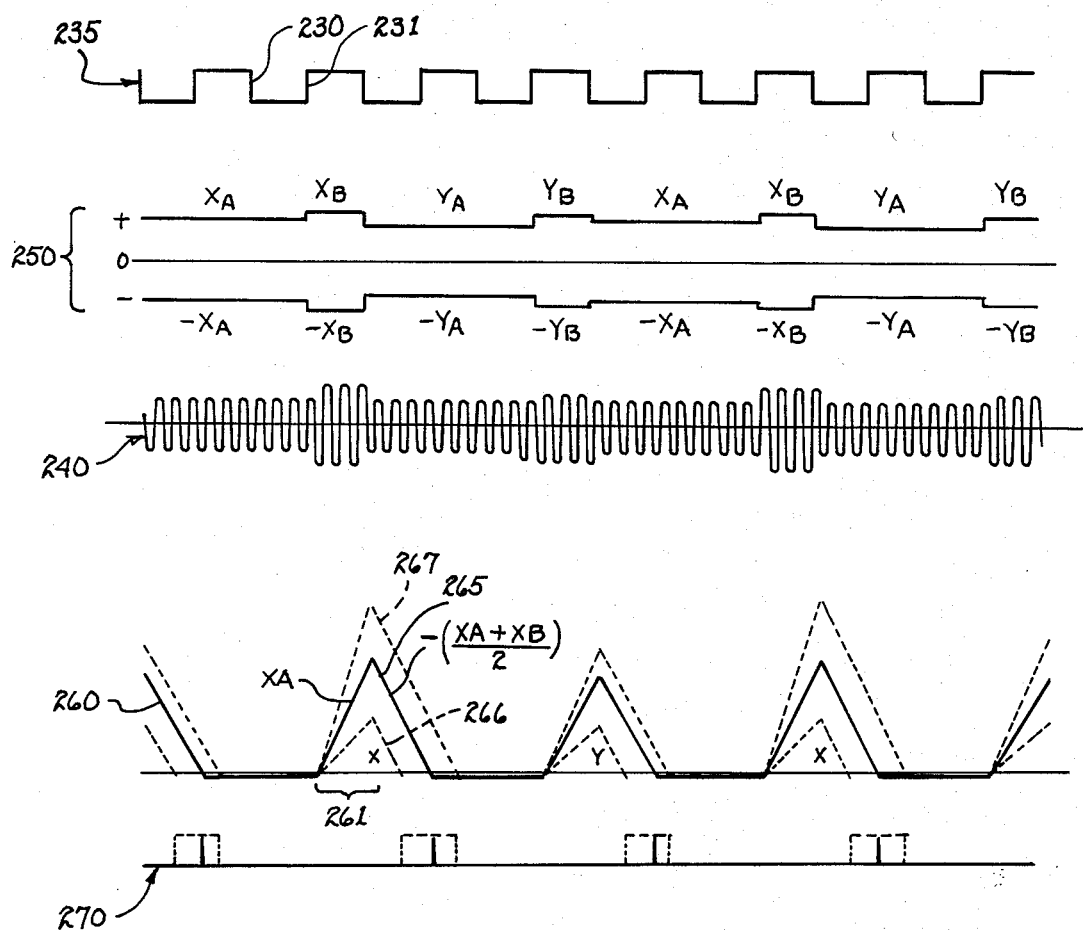
FIG. 8 is a diagram of several wave forms useful in describing the present invention.

A description of the operation of the system of the present invention may now be described by reference to the wave forms of FIGS. 6 and 8. As described previously, the positioning of the pen 10 in the proximity of the tablet 15, or on a sheet of paper placed on the surface of the tablet 15, will result in the radiation of an electric signal of 55 KHz from the tip of the pen into the surface of the tablet. The radiated signal will induce voltages at the terminals XA, XB, YA and YB in accordance with the relative position of the pen on the tablet. Typical wave forms are shown in FIG. 6 wherein it may be seen that the wave forms 174, 175, 176 and 177 represent the signals present at terminals XA, XB, YA and YB respectively. The scanner 180 sequentially connects each one of the latter signals to amplifier 181 and subsequently to the level detector 182. As stated previously, the timing of the switching of the scanner 180 is determined by the counter 183. The wave form 174 is connected or gated to the amplifier 181 for one period of the wave form 235 of FIG. 8. That is, during the first complete cycle of the wave form 235 the terminal XA is connected through the scanner 180 to the amplifier 181. At the beginning of the next period of the wave form 235 shown at 230 the signal or wave form 174 continues to be applied to the amplifier 181; however, at the half period point shown in wave form 235 at 231 the scanner switches the signal at terminal XB (wave form 175) to the amplifier 181. Thus, the signal XA is connected to the amplifier 181 for one full period and an additional one half-period of time. The signal at terminal XB is connected to the amplifier 181 for only one half period of time. This three to one ratio permits the generation of a digital position signal for the X axis independent of the amplitude of the respective signals in a manner to be described hereinafter. Upon completion of the first two full periods, that is at point 232 of the wave form 235, the scanner 180 connects the terminal YA (the wave form 176) to the amplifier 181. In a manner similar to that described in connection with the signals appearing at the XA and XB terminals, the scanner 180 will connect the signals appearing at the YA and YB terminals to the amplifier 181 in a time ratio of three to one. That is, the signal at terminal YA (wave form 176) will be connected to the amplifier 181 for one full period and an additional one-half period while the signal appearing at terminal YB (wave form 177) will be connected to the amplifier 181 for only one-half period. Upon completion of the third and fourth periods of the timing wave 235, the scanner 180 repeats the connection of the respective signals to the amplifier 181.

Thus, the amplifier 181 is connected to the terminal XA for one and one-half periods, to terminal XB for one-half period, to terminal YA for one and one-half periods, and to terminal YB for one-half period. This three to one ratio between the A and B terminals of the X and Y axis continues during the scanning operation. The output of the amplifier 181 will thus appear similar to that shown in wave form 240 of FIG. 8. This wave form (not to frequency scale) shows an AC signal of 55 KHz having an amplitude that changes in accordance with the amplitude of the signals present at the terminals XA, XB, YA and YB. It may be noted that the level corresponding to that present at the terminal XA exists in time with respect to the level XB in a ratio of three to one. That is, the output signal from the amplifier 181 at the level corresponding to the level at terminal XA exists for one and one-half periods of the wave form 235 while the level XB exists only for one-half of the period of the wave form 235.

The output of the amplifier 181 is applied to a synchronous detector 182 that provides a DC level output corresponding to the AC level inputs applied thereto by the scanner 180 through the amplifier 181. The DC levels of the detector 182 are amplified in amplifier 185 and inverted in the inverter 186 such that the varying DC levels are available in both positive and negative polarities. The wave form thus existing at the outputs of the amplifier 185 and the inverter 186 is schematically represented in wave form 250 of FIG. 8. Once again, it may be seen that the voltage level corresponding to the voltage at terminal XA is present for a period of time corresponding to one and one-half periods of the wave form 235; similarly, the voltage level corresponding to the signal present at terminal XB is available for a period of time corresponding to one-half period of the wave form 235. The DC voltage levels then continue to change to conform to the levels corresponding to XA, XB, YA and YB.

The varying DC levels, both positive and inverted, as represented by the wave form 250, are switched through the scanner 190 to the capacitors C11, C12, C13 and C14. The capacitor C11 is charged to the DC level corresponding to the signal present at the terminal XA. That is, the DC level of wave form 250 corresponding to the first full period of wave form 235 is applied to the capacitor C11 to permit the capacitor to charge to that level. The scanner 190 then connects the inverted DC level corresponding to the signal at terminal XA to the capacitor C12 for a second period of the wave form 235. During the second period, scanner 180 switches to the voltage level at XB such that the inverted DC voltage level corresponding to the signal present at terminal XB is applied to the capacitor C12 during the last half of the second period.

At this point in time, the capacitor C11 will have been charged to a negative polarity level corresponding to the signal at XA while the capacitor C12 will have been connected sequentially to the inverted signal of XA for one-half period and the inverted signal XB for one-half period. The voltage then existing at capacitor C12 would be the average of the inverted DC levels of XA and XB and will be of positive polarity.

The scanner 190 then charges capacitors C13 and C14 in a similar manner. That is, capacitor C13 is charged to the DC level of the wave form 250 corresponding to the signal at terminal YA. The capacitor C14 is then charged to the average levels of the inverted wave form portions of wave form 250 corresponding to the signals at terminals YA and YB.

The scanner 200 sequentially connects the capacitors C11, C12, C13 and C14 to an integrator 210 through the amplifier 211. Since alternate capacitors are charged to opposite polarities, the sequential application of these capacitors to the integrator 210 will result in an output wave form from the integrator 210 appearing as the wave form 260 of FIG. 8. The application of the signals to the integrator may be recognized as an application of a dual-slope integrator. The integrator 210 is first subjected to the voltage level existing on capacitor C11 and is allowed to charge for a predetermined time shown, for example, at 261 of the wave form 260. During this period of time the output wave form of the integrator appears as shown in FIG. 8 as that portion designated XA. At the end of this period of time, the integrator is subjected to the level of the voltage existing on capacitor C12. It will be recalled that the level on capacitor C12 was inverted in addition to being the average of the levels corresponding to the voltages at terminals XA and XB. Thus, that portion of the wave form 260 corresponding to this period of time is indicated as XA+XB divided by 2 (the average of XA and XB—a positive quantity).

The time required for the integrator output to reach its peak level and return to cross the reference level is directly proportional to the X position of the pen on the tablet. In other words, the distance of the pen in the X direction from a reference point (the left margin for example) is directly proportional to the time required for the integrator output to reach its peak level and return to a reference level. The wave form 260 represents this relationship. It may be seen that the portion 265 of the wave form crosses the reference level at a count for example of 128. The particular tablet involved may be divided into 256 "X" positions each represented by a single count. If the portion 265 of the wave form 260 were as shown in broken lines 266, it may be seen that the wave form would have returned to the reference level at the point corresponding to a count of zero thus indicating that the pen is at the left margin of the tablet. Similarly, a wave form similar to that shown by the broken line 267 would have resulted in a crossing of the reference voltage at a point corresponding to a count of 256; the pen would thus have been positioned at the right margin of the tablet. The detection of the return to or passing through a reference voltage level of the output wave form or the integrator results in the production of a latch pulse or counter enable such as those shown in the wave form 270. A broken line is shown surrounding each of the pulses or latch pulses produced in the wave form of 270 to represent the "envelope" of time within which the latch pulse or counter enable may occur. The closer the latch pulse is to the beginning of this envelope the closer the pen is to the origin on the tablet's surface (usually the lower left hand corner). The latch pulse as shown in the wave form 270 is applied to a resetable counter 220 (FIG. 7) that, upon application of the latch pulse, will dump its contents into the register 225 and will reset to begin counting again during the next timing period for the output wave form 260.

It may be noted that the broken line "envelopes" in the wave form 270 are of different width for the X and Y signals. In many instances, it is advantageous to configure the tablet with an X dimension greater than the Y dimension. Thus, the envelope during which the latch pulse occurs will differ in time length for the X and Y axes.

A pure sine wave 55 KHz signal is thus applied to the pen of the present invention to be radiated through the surface of the tablet into the conductors comprising the grid for detecting the existence of the radiated signal. The detected signals are applied from the grid conductors to terminals XA and XB for deriving a signal corresponding to the X position of the pen and to terminals YA and YB to derive a signal corresponding to the Y position of the pen. The signals appearing at these four terminals are selectively and sequentially detected to derive DC voltage levels (both positive and negative) which are used to charge capacitors. The capacitors are charged to the positive and negative voltage levels by applying a charging level of the XA and YA terminals to respective capacitors while applying the average of the levels at the XA and XB terminals and the YA and YB terminals to the remaining two capacitors. The latter signals are inverted. The charge levels of the respective capacitors are then switched to a dual slope integrator and the output wave forms therefrom are timed. The time duration of the integrator output wave forms is directly proportional to the position of the pen relative to a reference position (usually the origin at the lower left corner). A counter may be used to derive a specific digital count representing a numerical representation of pen position.

Many variations may be incorporated in the embodiment chosen for illustration. For example, the frequency with which the respective scanners switch their input signals may vary greatly but are dependent upon each other. In the embodiment chosen for illustration, the scanner 180 for example scans the input signal thereto at approximately the rate of 100 per second. The size of the tablet as well as the resolution required for the particular application in which the tablet is to be used will determine the scanning rate. Circuits other than a dual slope integrator may be used to derive a timed signal proportional to the position of the pen along the X and Y directions.

The utilization of the phase changer 144 in FIG. 4 provides unique advantages in the system of the present invention. The phase changer is utilized to invert the phase of the 55 KHz signal being radiated by the pen. The inversion of the phase is accomplished once every one-half sampling. That is, referring to wave form 235 of FIG. 8, during the first period of the wave form, representing the application of the amplitude level of the signal at terminal XA to the remainder of the system, the phase will be reversed at each half-period. The synchronization of this phase inversion is accomplished in any convenient manner such as the application of an appropriate clock signal from the system clock to the inverter. The synchronous detector 182 is locked to the phase changes of the phase changer 144 through resistor 146 and terminal 147. The synchronous detection provides appropriate DC voltage levels and is relatively immune from extraneous noise entering the system. The inversion of the radiated (and thus detected) signal does not effect the operation of the system as described; however, the repeated phase inversions have the beneficial effect of cancelling out any common mode DC offset.

The method and system of the present invention therefore provides a means for determining the position of a pen on a tablet through the utilization of a grid acting essentially as an AC potentiometer for the detection of electric signals radiated from the pen into the grid. The only components in the grid are conductors and resistors which are passive, inexpensive, and can readily be implemented by deposition techniques. The simplicity of the grid is exemplified by the fact that only four output terminals are required for complete two dimensional position information. Although the amplitude of the signal appearing at the output terminals of the grid determines the position information of the pen, the technique of ratioing the signal levels eliminates dependence on amplitude; that is, if the signal being radiated by the pen is attenuated for any reason, the resulting effect on the signals present at the output terminals of the tablet is effectively eliminated by the ratioing method of the present invention. The position information is thus independent of radiated pen-signal amplitude. The ratioing technique is accomplished through the utilization of the time division of the tablet output levels. Further, the detection and subsequent processing of the signals is time shared for all of the output terminals of the tablet. The efficient utilization of circuit components thus decreases the cost of the system. Many modifications of the specific embodiment will become apparent to those skilled in the art; the detectors and scanners or switches are readily available state of the art components that will be recognized by those skilled in the art without the requirement for further description.

It is understood that any kind of instrument may be used as the signal radiating element; that is, the pen may be replaced with a stylus, cursor, or mouse in those instances where a paper and pen are not desired. The pen of the present invention may be modified by replacing the ink cartridge with a non-writing conductor to create a stylus.

We claim:

1. A method for determining the position of an instrument on a surface having a plurality of grid conductors oriented in X and Y directions, all X conductors interconnected by resistors, said plurality of X conductors having a pair of terminals, a first X terminal connected to a first X conductor and a second X terminal connected to a last X conductor, all Y conductors interconnnected by resistors, said plurality of Y conductors having a pair of terminals, a first Y terminal connected to a first Y conductor and a second Y terminal connected to a last Y conductor, said method comprising the steps:
   a. generating an electrical signal;
   b. transmitting said signal from said instrument into said surface to cause respective signals to appear at each of said terminals;
   c. forming a ratio of signal levels detected at the X conductor terminals;
   d. generating a digital signal proportional to said ratio to thereby indicate the X position of said instrument;
   e. forming a rotio of signal levels at the Y conductor terminals; and
   f. generating a digital signal proportional to said ratio to thereby indicate the Y position of said instrument.

2. The method of claim 1 wherein the step of regenerating said electrical signal comprises the step of generating a substantially pure sine wave.

3. The method of claim 1 wherein the generation of a digital signal proportional to said ratio includes the steps of:
   a. detecting the amplitude of the signal level at the first of one of said pair of terminals, inverting and applying said level to an integrator for a predetermined time to cause an output thereof to reach a predetermined level above a reference level;
   b. detecting the amplitude of the signal level at second of sad one of said pair of terminals;
   c. averaging the amplitude of the signal levels at said pair of terminals, and applying said average level to said integrator; and
   d. measuring the time required for the integrator output to return to said reference level.

4. Apparatus for determining the position of an instrument on a surface comprising:
   a. a plurality of grid conductors oriented in X and Y directions, all X conductors interconnected by resistors, said plurality of X conductors having a pair of terminals, a first X terminal connected to a first X conductor and a second X terminal connected to a last X conductor, all Y conductors interconnected by resistors, said plurality of Y conductors having a pair of terminals, a first Y terminal connected to a first Y conductor and a second Y terminal connected to a last Y conductor;
   b. a signal generator for generating an electrical signal;
   c. an instrument connected to said signal generator for transmitting said electrical signal through said surface into said grid to cause signals to appear at each of said terminals;
   d. a detector for sequential connection to each of said terminals;
   e. switch means for sequentially connecting said detector to said terminals;
   f. means for ratioing the level of the signals at the X terminals and for ratioing the level of the signals at the Y terminals;
   g. means responsive to the ratio of signal levels at the X terminals for generating a digital signal proportional to the instrument position in the X direction;
   h. means responsive to the ratio of signal levels at the Y terminals for generating a digital signal proportional to the instrument position in the Y direction.

5. The apparatus of claim 4 wherein said signal generator generates a substantially pure sine wave at a predetermined frequency.

6. The combination set forth in claim 4 wherein said instrument comprises a pen having a cartridge therein for writing and for transmitting said electrical signal.

7. The combination set forth in claim 4 wherein the means for ratioing the level of the signals at the X terminals and at the Y terminals includes a plurality of capacitors the first of which is charged to the level of the signal at the first of said X terminals, the second of which is charged to the average of the levels of the signals at the X terminals, the third of which is charged to the level of the signal at the first of said Y terminals, and the fourth of which is charged to the average of the levels of the signals at the Y terminals.

8. The combination set forth in claim 4 wherein the means responsive to the ratio of the signal levels at the X and at the Y terminals to generate digital signals proportional to the position of the instrument includes a dual slope integrator.

9. A pen, for use in a graphic tablet system having a tablet with grid conductors therein to receive electric signals transmitted from the pen, comprising:
   a. a housing having a cylindrical bore therein;
   b. an ink cartridge mounted in said bore, for limited axial movement therein, having a point extending out of said housing for contacting a writing surface;
   c. an insulating sleeve mounted in said bore between said housing and said cartridge;
   d. a plunger mounted in said bore for limited axial movement therein and positioned for continuous contact with an end of said cartridge remote from said point;
   e. a stationary electrical contact within said bore positioned to be contacted by said plunger;
   f. spring biasing means urging said plunger into contact with said cartridge to urge the cartridge point to extend out of said housing and to simultaneously urge said plunger to contact said stationary electrical contact;
   g. a first conductor connected to said plunger and a second conductor connected to said stationary contact;

whereby an AC electrical signal on said first conductor may be continuously transmitted through said plunger, cartridge, and to said point for radiation to said tablet when the contact between said plunger and stationary electrical contact is open or closed, and whereby a DC signal on said first conductor may be transmitted to said second conductor only when said plunger and stationary electrical contact are in contact, said DC circuit being opened by breaking said contact by urging said point toward said housing by contacting a writing surface.

10. A combustion set forth in claim 9 wherein said housing is metal and including a second spring biasing means, weaker than the first, positioned within said bore to urge said cartridge into continuous contact with said plunger.

11. A pen system for use in a graphic tablet system having a tablet with grid conductors therein to receive AC electrical signals transmitted from the pen, said system including:
 a. a pen for radiating an electrical signal provided thereto;
 b. means for generating an AC electrical signal to be radiated to said graphic tablet;
 c. means for generating a DC signal
 d. a pen driver connected to said signal generating means having a tuned circuit for increasing the amplitude of the AC signal to be applied to the pen for radiation to the tablet surface;
 e. a pair of normally closed contacts mounted within said pen;
 f. a first conductor connecting said AC and said DC signals to one of said contacts;
 g. a pen cartridge mounted within said pen and connected to said one of said contacts for continuously transmitting said AC signal to said tablet;
 h. a second conductor connected to the other of said contacts for receiving said DC signal from said first conductor only when said contacts are closed.

12. The system of claim 11 wherein said pen cartridge is movable within said pen to open said contacts in response to the pressure applied thereto when writing to thereby interrupt the transmission of said DC signal to said second conductor.

* * * * *